(12) United States Patent
Woo et al.

(10) Patent No.: US 7,939,196 B2
(45) Date of Patent: May 10, 2011

(54) LITHIUM BATTERY WITH SHORT CIRCUIT PREVENTING CORE MEMBER

(75) Inventors: Soon Ki Woo, Youngin-si (KR); Young Taek Kim, Youngin-si (KR); Kwan Sic Chun, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 827 days.

(21) Appl. No.: 11/287,374

(22) Filed: Nov. 28, 2005

(65) Prior Publication Data

US 2006/0121339 A1 Jun. 8, 2006

(30) Foreign Application Priority Data

Nov. 29, 2004 (KR) ........................ 10-2004-0098862

(51) Int. Cl.
*H01M 10/0587* (2010.01)
(52) U.S. Cl. ............................ 429/208; 429/161; 429/94
(58) Field of Classification Search .................. None
See application file for complete search history.

(56) References Cited

U.S. PATENT DOCUMENTS

| | | | | |
|---|---|---|---|---|
| 5,053,297 A | * | 10/1991 | Yamahira et al. | ......... 429/231.3 |
| 2003/0148175 A1 | | 8/2003 | Iwanaga et al. | |

FOREIGN PATENT DOCUMENTS

| CN | 1423361 | | 6/2003 |
|---|---|---|---|
| JP | 11224689 A | * | 8/1999 |
| JP | 11307132 A | * | 11/1999 |
| JP | 2003-092148 | | 3/2003 |
| JP | 2003092148 A | * | 3/2003 |
| JP | 2003-229177 | | 8/2003 |
| JP | 2003229177 A | * | 8/2003 |

* cited by examiner

*Primary Examiner* — Keith Walker
(74) *Attorney, Agent, or Firm* — H.C. Park & Associates, PLC (57) ABSTRACT

A cylindrical lithium rechargeable battery including a winding type electrode assembly having a first electrode plate, a second electrode plate, and a separator interposed between the first and second electrode plates, a core member arranged in a central space of the electrode assembly and having a short circuit preventing part, a case having a space for accommodating the electrode assembly, and a cap assembly combined with an upper portion of the case to hermetically seal the case.

8 Claims, 11 Drawing Sheets

LITHIUM BATTERY WITH SHORT CIRCUIT PREVENTING CORE MEMBER

CROSS REFERENCE TO RELATED APPLICATION

This application claims priority to and the benefit of Korean Patent Application No. 10-2004-0098862, filed on Nov. 29, 2004, which is hereby incorporated by reference for all purposes as if fully set forth herein.

BACKGROUND OF THE INVENTION

1. Field of the Invention

The present invention relates to a cylindrical lithium rechargeable battery, and more particularly, to a cylindrical lithium rechargeable battery including a core member having a short circuit preventing part to prevent electrode assembly short circuits.

2. Discussion of the Background

Recently, small and light-weight electronic devices such as cellular phones, notebook computers, and camcorders have been widely developed and manufactured. Such devices have built-in battery packs in order to operate without a separate power supply. The is built-in battery pack includes at least one battery for outputting a predetermined voltage to drive the portable electronic device for a predetermined time period.

The battery packs typically use rechargeable batteries for economical usage. For example, the rechargeable batteries may be nickel-cadmium (Ni—Cd) batteries, nickel-hydrogen (Ni-MH) batteries, and lithium batteries such as a lithium (Li) battery and a lithium ion (Li-ion) battery.

In particular, the lithium rechargeable battery's operating voltage (3.6V) may be about three times higher than that of the nickel-cadmium battery and the nickel-hydrogen battery, which are widely used in portable electronic devices. Further, the lithium rechargeable battery's energy density (energy per unit weight) is larger than that of the nickel-cadmium battery and the nickel-hydrogen battery. Therefore, usage of the lithium rechargeable battery has rapidly increased.

In a typical lithium rechargeable battery, a lithium oxide material is used as a positive electrode activation material, and a carbon material is used as a negative electrode activation material. Generally, a lithium rechargeable battery may be classified as a liquid electrolyte battery or a polymer electrolyte battery according to its electrolytic solution. Additionally, a lithium battery using a liquid electrolyte is typically called a lithium ion battery, and a lithium battery using a polymer electrolyte is typically called a lithium polymer battery. Furthermore, the lithium rechargeable batteries can be manufactured in various shapes. Representative shapes include a cylinder, a polygon, and a pouch.

The typical cylindrical lithium rechargeable battery includes an electrode assembly having a positive electrode plate coated with positive electrode activation material, a negative electrode plate coated with negative electrode activation material, and a separator interposed between the positive and negative electrode plates to prevent short circuits therebetween. These components are substantially cylindrically wound together and housed in a cylindrical case. An electrolyte solution is injected into the cylindrical case to allow lithium ion movement.

A cylindrical lithium rechargeable battery may be manufactured as follows.

First, the positive electrode plate, which is coated with positive electrode activation material and connected to a positive electrode tap, the negative electrode plate, which is coated with negative electrode activation material and connected to a negative electrode tap, and the separator are stacked. The stack is then wound in a substantially cylindrical shape, thereby completing the electrode assembly.

Next, the substantially cylindrical electrode assembly is placed in the cylindrical case, a process for preventing the electrode assembly from separating is performed, the electrolyte solution is injected into the cylindrical case, and the case is sealed.

In general, in the cylindrical lithium rechargeable battery, an empty space may be formed at a central portion of the electrode assembly. However, the empty space may allow the electrode assembly to unwind and deform.

A method of inserting a predetermined core member into the central space of the electrode assembly has been proposed to solve this problem.

Figure 1:
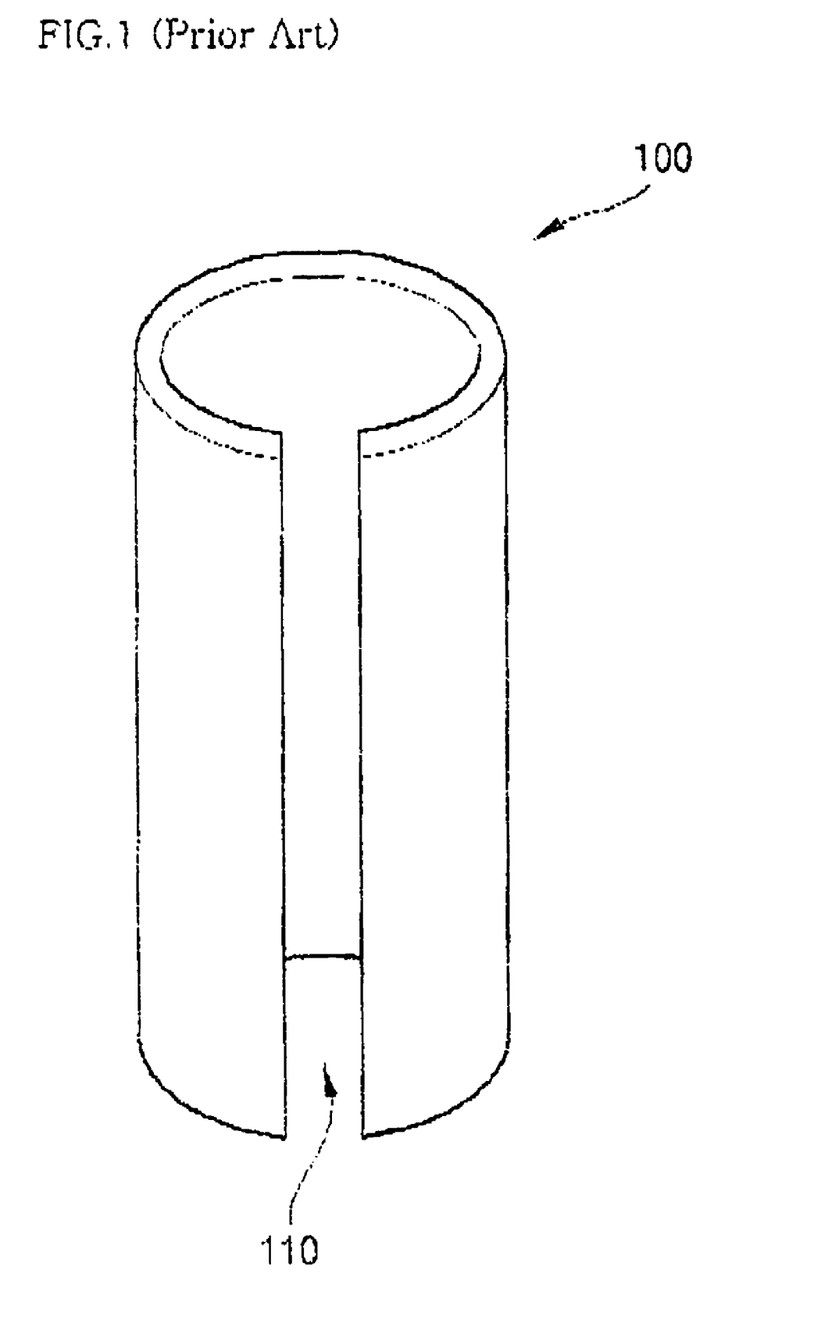
FIG. 1 is a perspective view for explaining a conventional core member.

FIG. 1 is a perspective view for explaining a conventional core member.

Referring to FIG. 1, the conventional core member 100 may be constructed in a shape of a pipe by winding a plate, where a cut 110 is formed along a longitudinal direction thereof.

The core member 100 may prevent a wound electrode assembly from unwinding. Additionally, the core member 100 may prevent the electrode assembly from being deformed due to external pressure. Namely, the core member 100 may also support the electrode assembly against external pressure.

However, if external pressure moves or deforms the core member 100, the electrode assembly, particularly the separator, may be damaged. More specifically, since upper and lower ends of the cut 110 formed along the longitudinal direction of the core member 100 may be sharp, the edge may pierce the electrode assembly, particularly, the separator, and damage the electrode assembly.

As described above, damage to the separator may cause a short circuit between the positive and negative electrode plates, so that the cylindrical lithium rechargeable battery may break or explode.

In order to solve the aforementioned problem, a core member 100 may be constructed by bending both ends of the cut 110 in an inward direction of the core member 110, as disclosed in Japanese Laid-open Application No. 03-092148.

However, when external pressure is exerted on the electrode assembly, the core member 100 may not adequately support the electrode assembly against the external pressure corresponding to the bended portions of both ends of the cut 110.

SUMMARY OF THE INVENTION

The present invention provides a cylindrical lithium rechargeable battery including a core member having a short circuit preventing part to prevent electrode assembly short circuits.

Additional features of the invention will be set forth in the description which follows, and in part will be apparent from the description, or may be learned by practice of the invention.

The present invention discloses a cylindrical lithium rechargeable battery including a winding type electrode assembly having a first electrode plate, a second electrode plate, and a separator between the first and second electrode plates, a core member arranged in a central space of the electrode assembly and having a short circuit preventing part, a case having a space for accommodating the electrode assembly, and a cap assembly combined to an upper portion of the case to hermetically seal the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present. In the drawings, like reference numerals denotes like components.

Figure 2A:
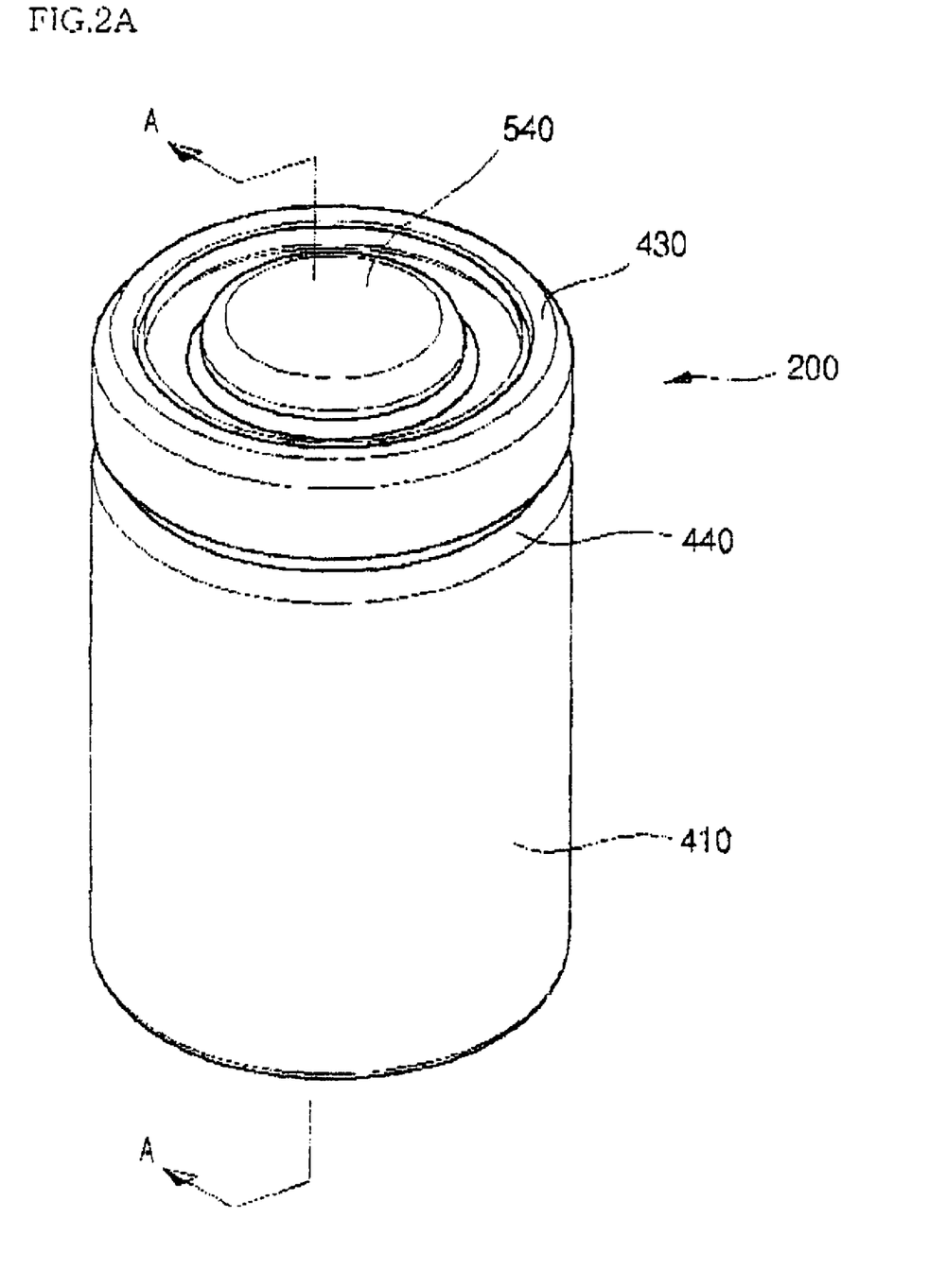
FIG. 2A is a perspective view for explaining a cylindrical lithium rechargeable battery according to an embodiment of the present invention.
Figure 2B:
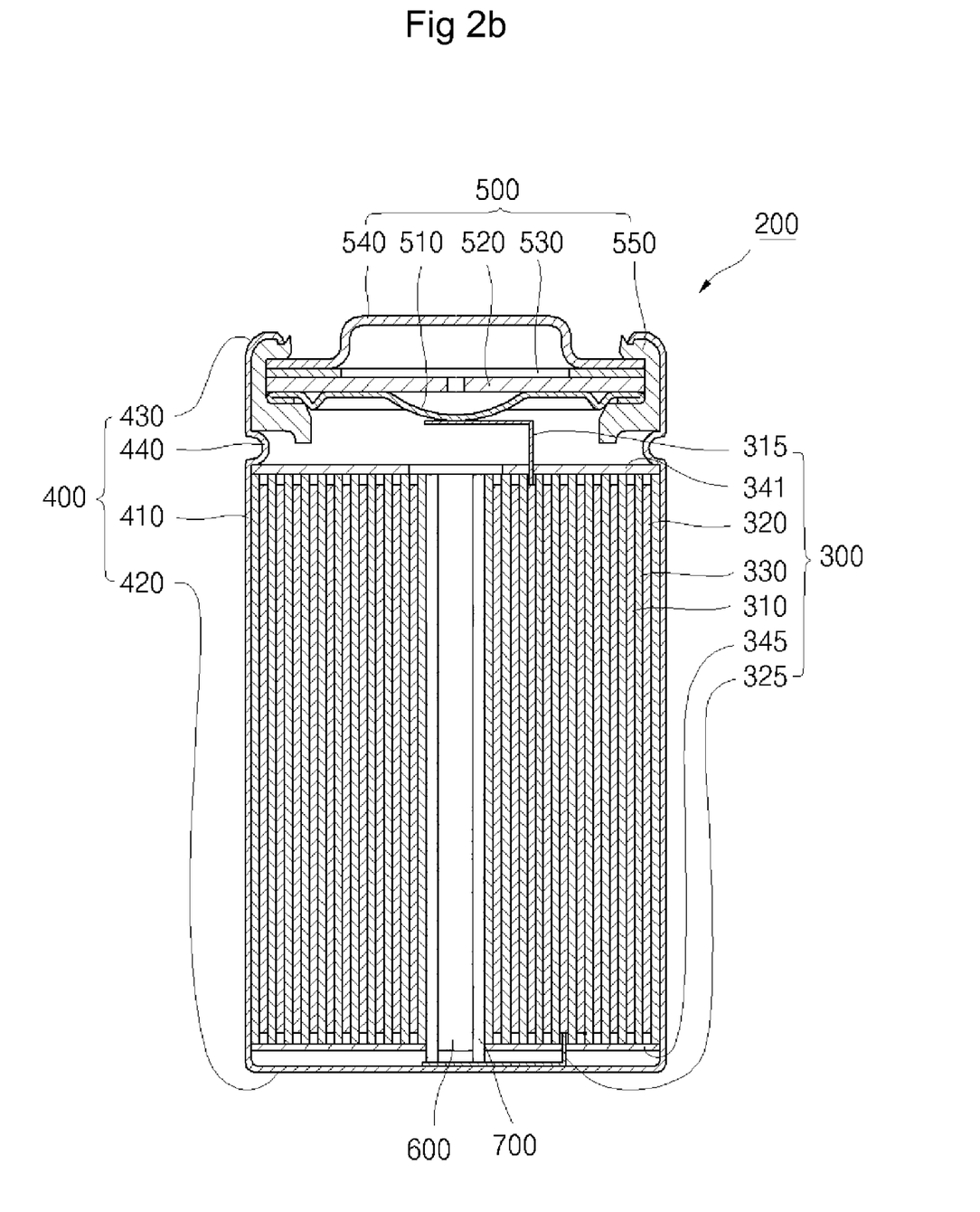
FIG. 2B is a cross sectional view along line A-A of FIG. 2A.

FIG. 2A is a perspective view for explaining a cylindrical lithium rechargeable battery according to an embodiment of the present invention. FIG. 2B is a cross sectional view along line A-A of FIG. 2A.

Referring to FIG. 2A and FIG. 2B, the cylindrical lithium rechargeable battery 200 includes an electrode assembly 300, a cylindrical case 400, a cap assembly 500, an is electrolyte solution 600, and a core member 700. The electrode assembly 300 generates a voltage difference during charging and discharge periods. The cylindrical case 400 accommodates the electrode assembly 300, and the cap assembly 500 is included at an upper portion of the cylindrical case 400 to prevent the electrode assembly 300 from separating. The electrolyte solution 600 is injected into the cylindrical case 400 to allow lithium ions to move in the electrode assembly 300, and the core member 700 is arranged in a central space of the electrode assembly 300.

The electrode assembly 300 includes a first electrode plate 310 coated with one of positive and negative electrode activation material (for example, a positive material), a second electrode plate 320 coated with the other one of the positive and negative electrode activation material (for example, a negative electrode activation material), and separator 330 arranged between the first and second electrode plates 310 and 320. The separator 330 prevents short circuits between the first and second electrode plates 310 and 320 and allows lithium ions to move therein. The first and second electrode plates 310 and 320 and the separator 330 are wound in a substantially cylindrical shape and accommodated in the cylindrical case 400. A first electrode tap 315, which may be generally made of aluminum (Al) and protrude upwardly in a predetermined length, is coupled with the first electrode plate 310. Additionally, a second electrode tap 325, which may be generally made of nickel (Ni) and protrude downwardly in a predetermined length, is coupled with the second electrode plate 320. Further, upper and lower insulating plates 341 and 345 are attached on upper and lower portions of the electrode assembly 300 in order to avoid contact with the cap assembly 500 and the cylindrical case 400, respectively.

The cylindrical case 400 has a predetermined space, in which the cylindrical type electrode assembly 300 can be inserted, and a cylindrical surface 410 having a predetermined diameter. A bottom plate 420 is arranged at a lower portion of the cylindrical surface 410 to close a lower space of the cylindrical surface 410. An upper portion of the cylindrical surface 410 is open so that the electrode assembly 300 may be inserted in the cylindrical case 400. One of the first and second electrode taps 315 and 325 (for example, the second electrode tap 325) of the electrode assembly 300 is attached at a central portion of the bottom plate 420 so that the cylindrical case 400 may function as the same electrode as the second electrode plate 320 (for example, a negative electrode port). Additionally, the cylindrical case 400 may be generally made of aluminum (Al), iron (Fe), or an alloy thereof. The cylindrical case 400 also includes a crimping portion 430, which has a one-side bending structure to downwardly press the upper portion of the cap assembly 500, and a beading part 440, which has an inwardly-recessed structure to upwardly press the lower portion of the cap assembly 500.

The cap assembly 500 includes a conductive safety vent 510, a printed circuit board (PCB) 520, a positive temperature device 530, a conductive electrode cap 540, and an insulating gasket 550. The first electrode tap 315 may be welded to the conductive safety vent 510, which may invert its shape in the event of overcharge or abnormal heat generation. The PCB 520 is electrically and mechanically coupled with an upper portion of the conductive safety vent 510, and the circuit is disconnected when and if the conductive safety vent 510 is inverted. The positive temperature device 530 is electrically and mechanically coupled with an upper portion of the printed circuit board 520, and the circuit is disconnected at or above a predetermined temperature. The conductive electrode cap 540 is electrically and mechanically coupled with an upper portion of the positive temperature device 530 to apply a real current to outside portions. The insulating gasket 550 is shaped to surround circumferential portions of the safety vent 510, the PCB 520, the positive temperature device 530, and the electrode cap 540 in order to insulate these components from the cylindrical case 400. Here, the electrode cap 540 is electrically coupled with one of the first and second electrode taps 315 and 325 (for example, the first electrode tap 315) of the electrode assembly 300 so that the electrode cap 540 may function as the same electrode as the first electrode plate 310 (for example, the positive electrode port).

The electrolyte solution 600 serves as a medium through which lithium (Li) ions may move. The lithium ions are generated through an electrochemical reaction at positive and negative electrodes in the battery during charge and discharge periods. Numerous electrolyte solutions 600 may be used. For example, the electrolyte solution 600 may be a non-aqueous organic electrolyte solution, which is a mixture of a lithium salt and a pure organic solvent. Additionally, the electrolyte solution 600 may be a polymer using a polymer electrolyte.

The core member 700 is inserted into a central space of the winding type electrode assembly 300 to prevent the electrode assembly 300 from relaxing and unwinding and to prevent the electrode assembly 300 from deforming due to external pressure. Additionally, in a case where the second electrode tap 325 is welded to a central portion of the bottom plate 420, the core member 700, which is inserted in to the central space of the winding type electrode assembly 300, presses the second electrode tap 325, so that the second electrode tap 325 may contact the bottom plate 420 of the cylindrical case 400. The core member 700 has substantially a pipe shape. Further, a cut is formed along the longitudinal direction of the core member 700. When the core member 700 is added to the electrode assembly 300, the cut may be maintained in a predetermined distance separation state. In some cases, the cut may be in a contact state. Furthermore, the core member 700 has a short circuit preventing part to prevent the electrode assembly 300, particularly, the separator 330, from breaking when the core member 700 is inserted or moved.

Figure 3A:
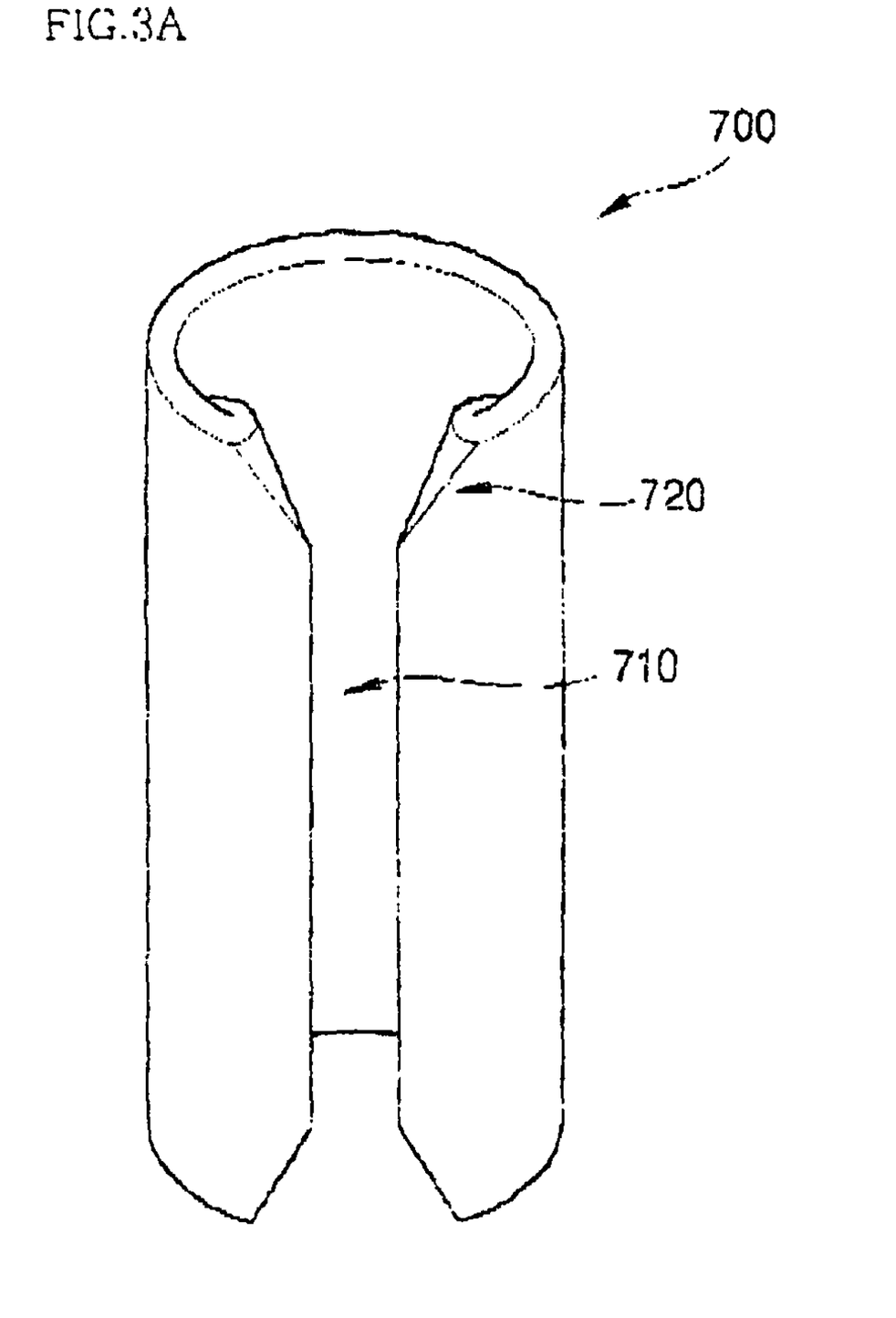
FIG. 3A, FIG. 3B and FIG. 3C are views for explaining a core member of a cylindrical lithium rechargeable battery according to an embodiment of the present invention.
Figure 3B:
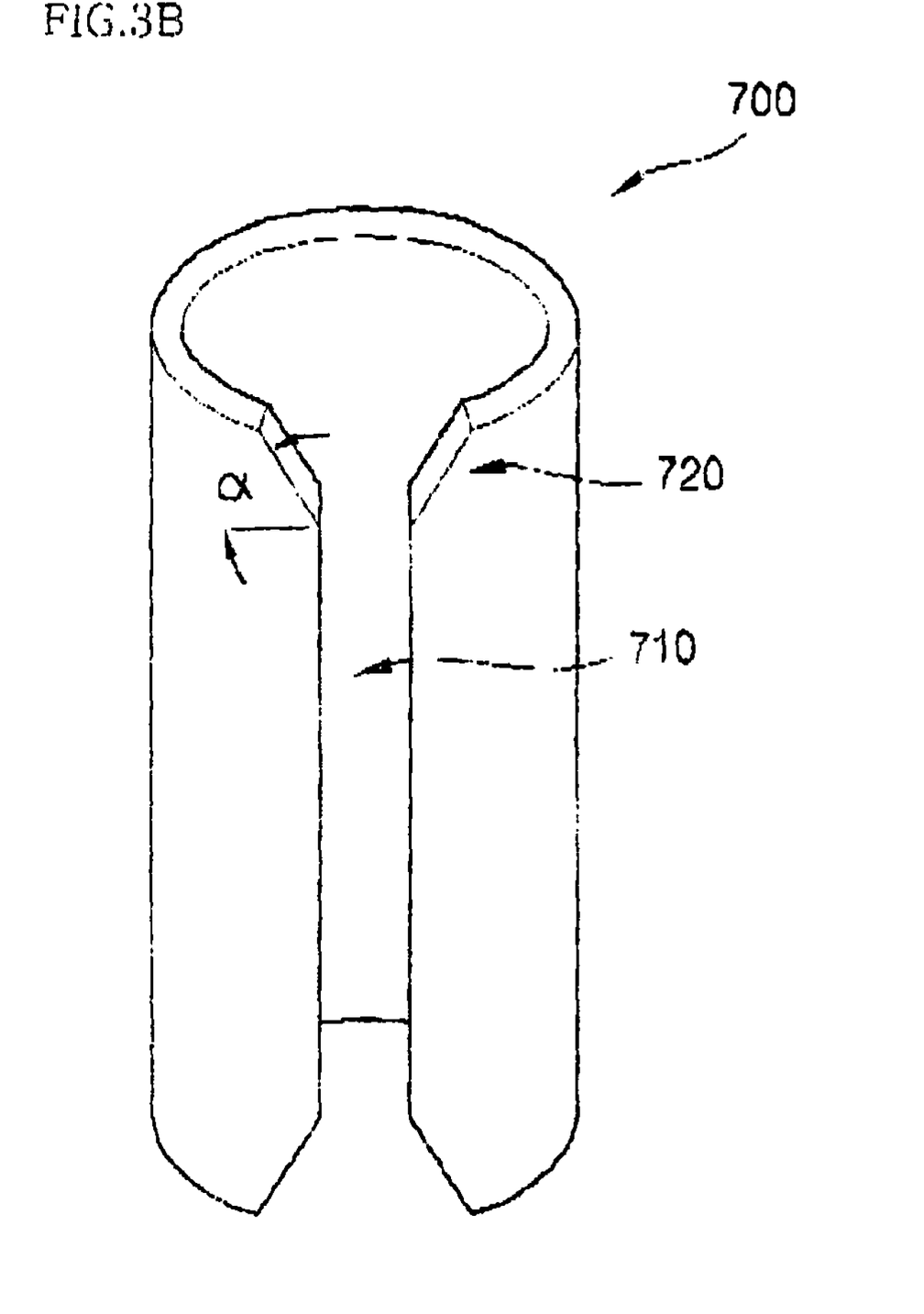
Figure 3C:
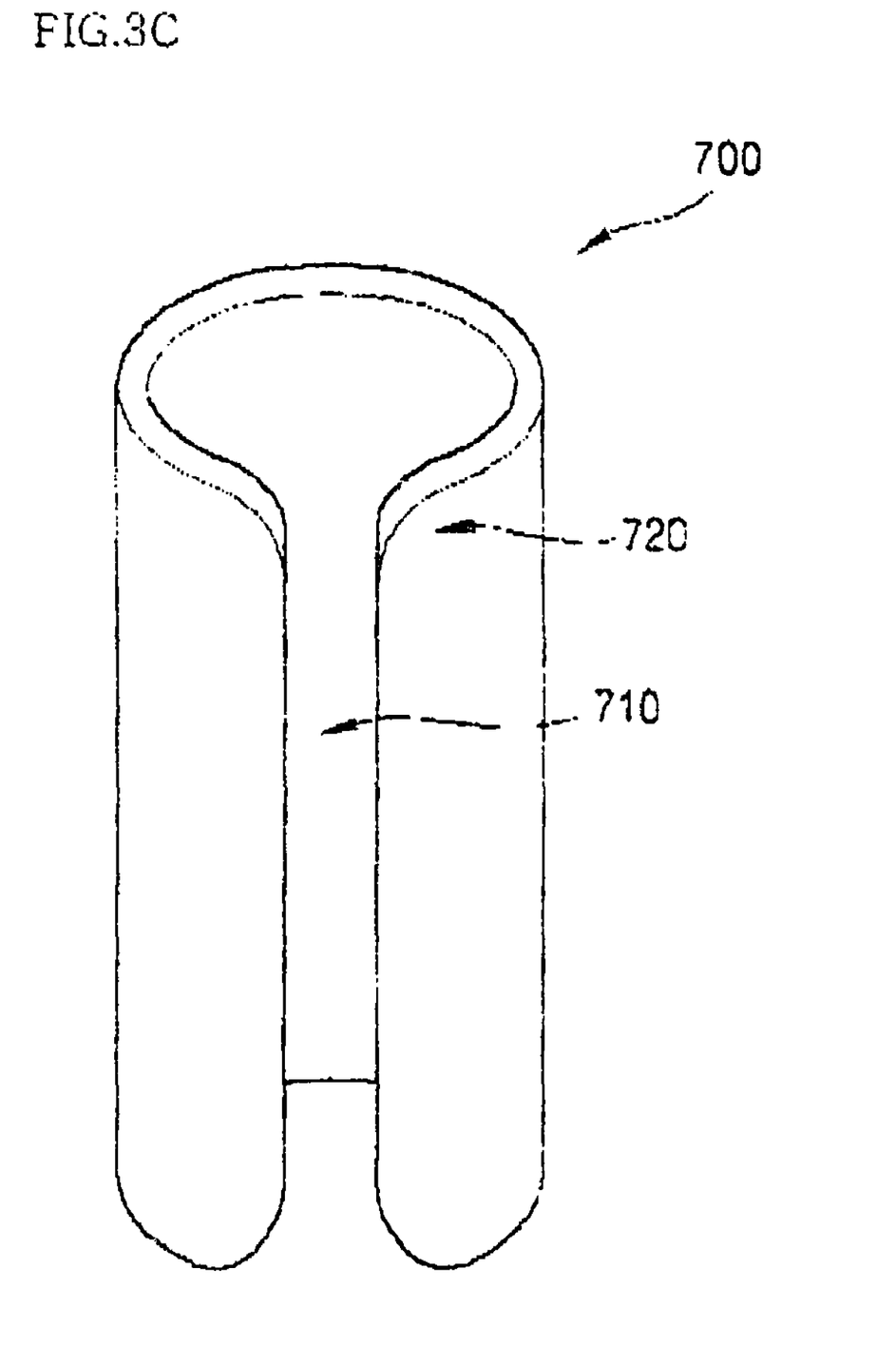

FIG. 3A, FIG. 3B and FIG. 3C are views for explaining a core member of a cylindrical lithium rechargeable battery according to an embodiment of the present invention.

Referring to FIG. 3A, FIG. 3B, and FIG. 3C, a core member 700 of a cylindrical lithium rechargeable battery is constructed substantially in a pipe shape with a cut 710 formed along a longitudinal direction thereof. A short circuit preventing part 720 is provided to at least lower ends of upper and lower ends of both side edges of the cut 710. Here, when the core member 700 is inserted into a central space of the electrode assembly 300, or when the core member 700 moves due to external impact such as by being dropped, the short circuit preventing part 720 may prevent the core member 700 from damaging the electrode assembly 300, particularly, the separator 330, thereby preventing short circuits between the first and second electrode plates 310 and 320.

The core member's short circuit preventing part 720 may be constructed in various shapes.

For example, as shown in FIG. 3A, the short circuit preventing part 720 may be formed so that a portion of at least lower ends of upper and lower ends of both side edges of the cut 710 of the core member 700 are bent or folded in an inward direction of the core member 700.

Alternatively, as shown in FIG. 3B, the short circuit preventing part 720 may be formed so that at least lower ends of upper and lower ends of both side edges of the cut 710 of the core member 700 have a tapered shape or a chamfer. Here, a tapered angle α of the short circuit preventing part 720 is less than 90° and preferably in a range of 30° to 60°.

Alternatively, as shown in FIG. 3C, the short circuit preventing part 720 may be formed so that at least lower ends of upper and lower ends of both side edges of the cut 710 of the core member 700 have a round (i.e. curved) shape.

Figure 4:
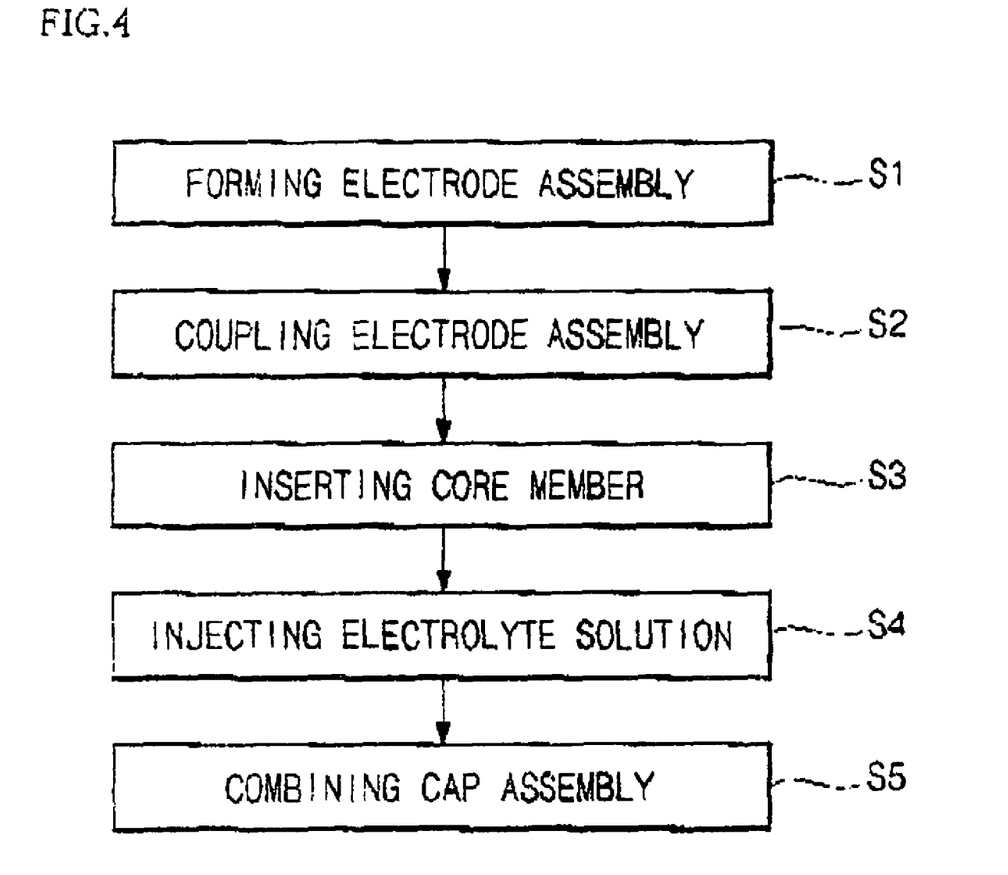
FIG. 4 is a flowchart for explaining a method of manufacturing a cylindrical lithium rechargeable battery according to an embodiment of the present invention.

FIG. 4 is a flowchart for explaining a method of manufacturing a cylindrical lithium rechargeable battery according to an embodiment of the present invention.

Referring to FIG. 4, the method of manufacturing a cylindrical lithium rechargeable battery according to an embodiment of the present invention includes an electrode assembly forming step S1 of forming an electrode assembly 300, an electrode assembly coupling step S2 of coupling the electrode assembly 300, a core member inserting step S3 of inserting a core member 700, an electrolyte solution injection step S4 of injecting an electrolyte solution 600, and a cap assembly combining step S5 of combining a cap assembly 500.

FIG. 5A, FIG. 5B, FIG. 5C and FIG. 5D are views for explaining a method of manufacturing a cylindrical lithium rechargeable battery according to an embodiment of the present invention. The method of manufacturing the cylindrical lithium rechargeable battery will be described with reference to FIG. 4 and FIG. 5A, FIG. 5B, FIG. 5C and FIG. 5D.

Figure 5A:
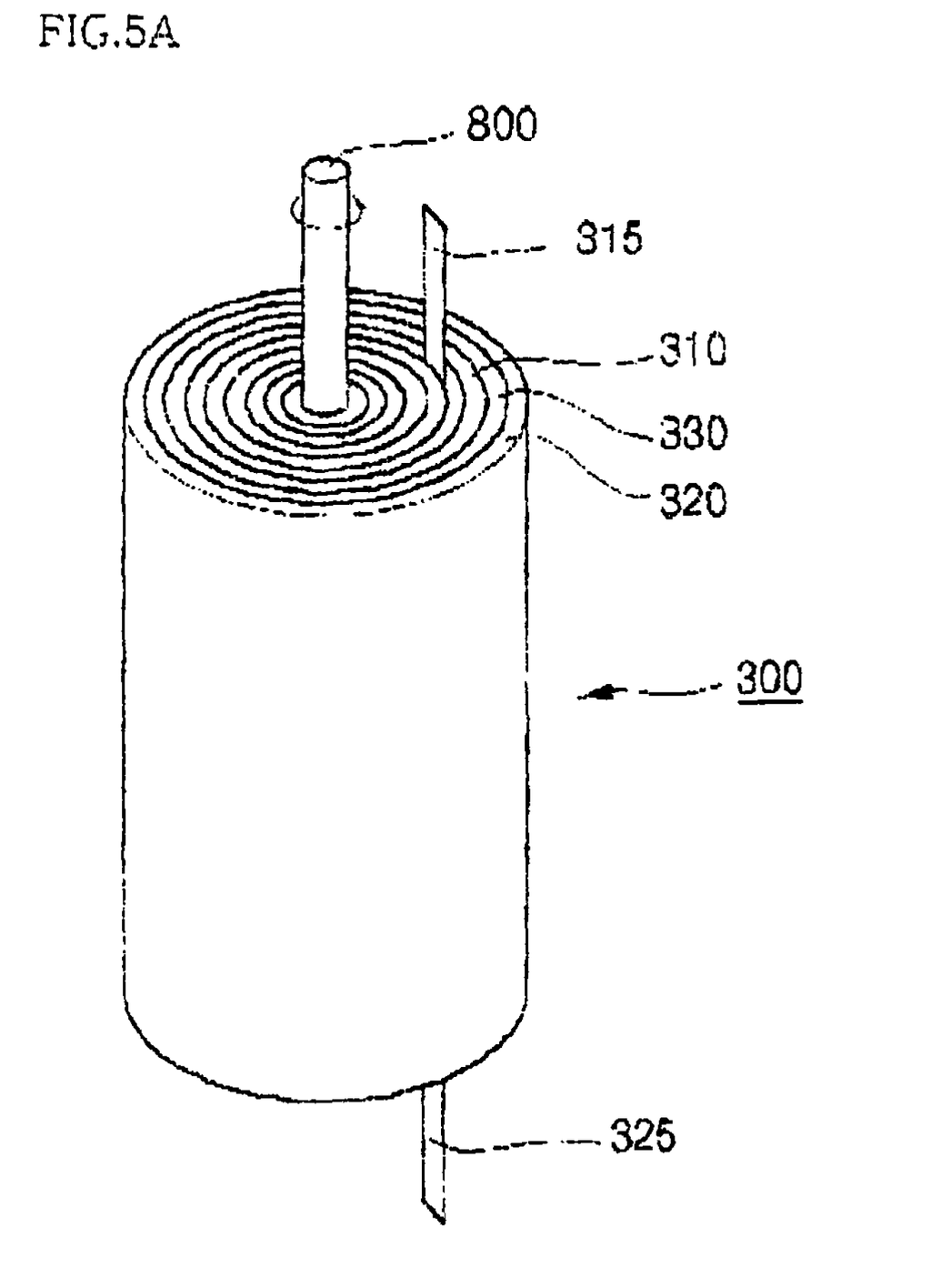
FIG. 5A, FIG. 5B, FIG. 5C and FIG. 5D are views for explaining a method of manufacturing a cylindrical lithium rechargeable battery according to an embodiment of the present invention.

Referring to FIG. 5A, in the electrode assembly forming step S1, the first electrode plate 310, the separator 330, and the second electrode plate 320 are sequentially stacked. A winding shaft 800 is then arranged at one end of the stacked structure, and the stacked structure is wound in a substantially cylindrical shape, thereby completing the electrode assembly 300. Here, before the winding process, the first and second electrode taps 315 and 325 are attached to the first and second electrode plates 310 and 320, respectively.

Figure 5B:
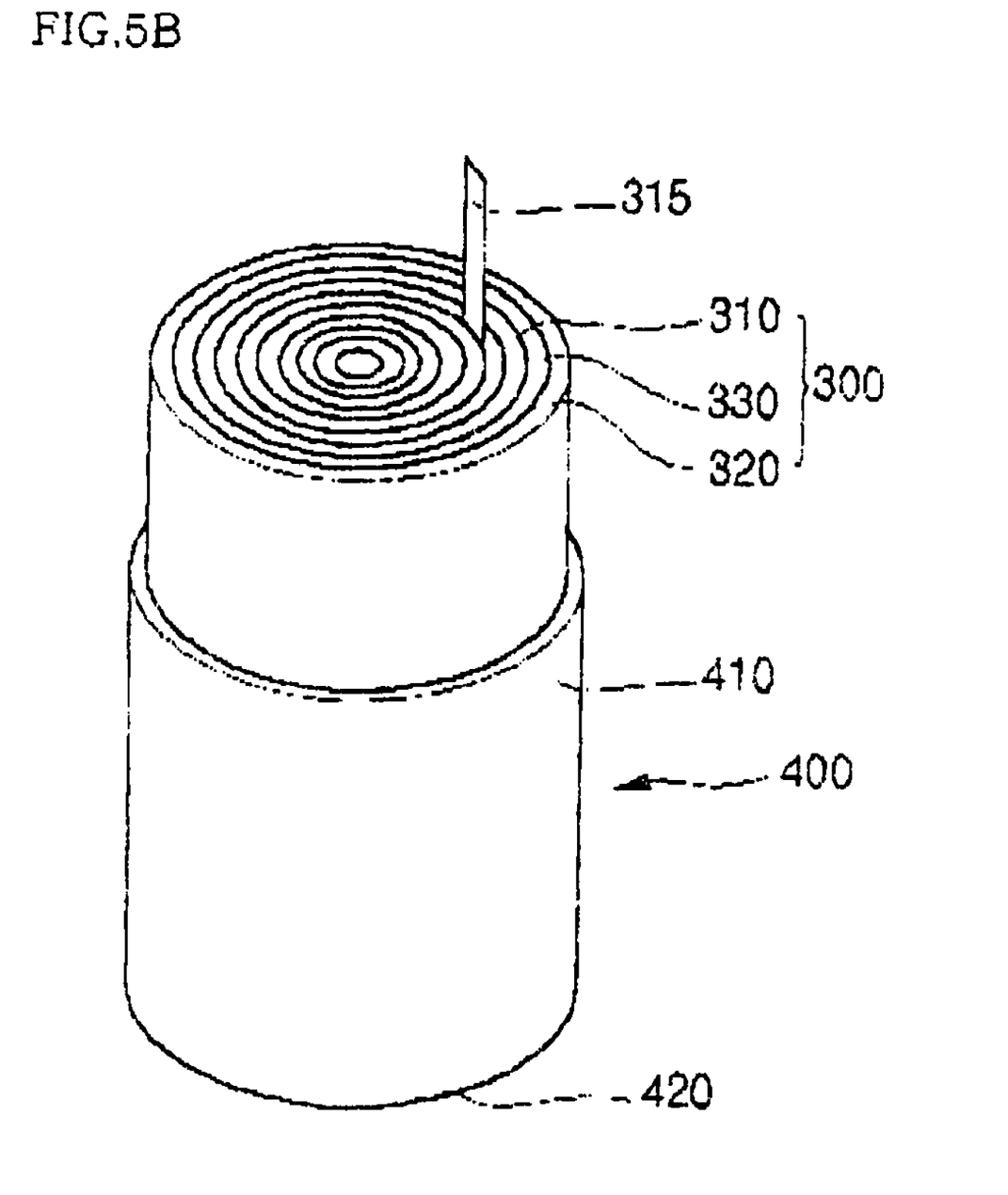

Referring to FIG. 5B, in the electrode assembly coupling step S2, the cylindrical electrode assembly 300 is coupled with the cylindrical case 400. After coupling the electrode assembly 300 with the cylindrical case 400, the winding shaft 800 is separated from the electrode assembly 300, thereby forming a substantially cylindrical space at the central portion of the electrode assembly 300.

Here, the winding shaft 800 may be separated before the electrode assembly 300 is coupled, but the present invention is not limited thereto. Additionally, the lower insulating plate 345 (FIG. 5C) is coupled with the cylindrical case 400 in advance.

Figure 5C:
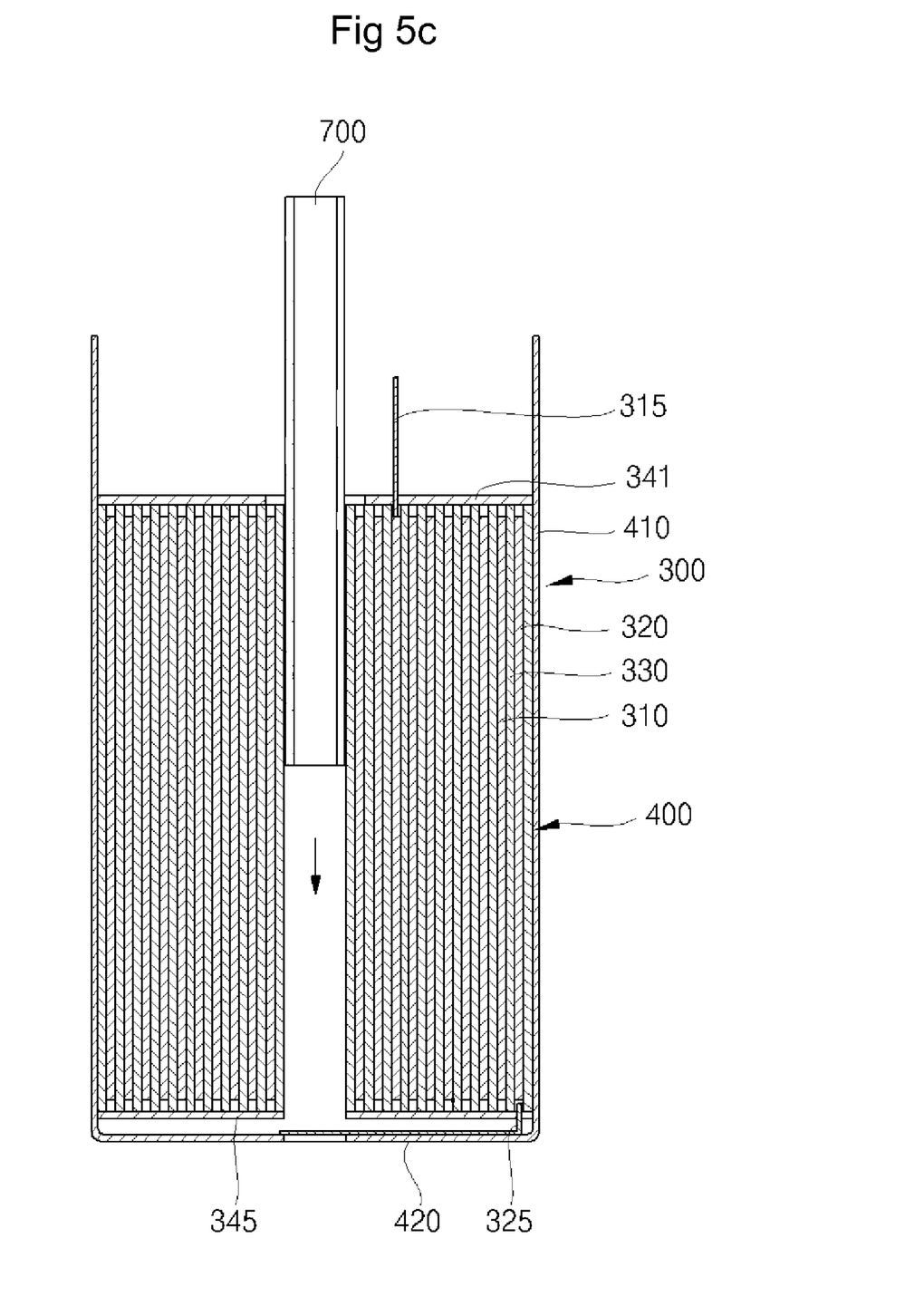

Referring to FIG. 5C, in the core member inserting step S3, the core member 700 is inserted in the space, which is generated by separating the winding shaft 800, of the central portion of the electrode assembly 300.

Before inserting the core member 700, one of the first and second electrode taps 315 and 325 of the electrode assembly 300 (for example, the second electrode tap 325) may be attached to the bottom plate 420 of the cylindrical case 400 by resistance welding. Therefore, the core member 700 is arranged in contact with an upper surface of the second electrode tap 325 to secure the coupling of the second electrode tap 325 to the cylindrical case 400. The core member 700 may have a height that is about 90% to 110% of the height of the electrode assembly 300. If the height of the core member 700 is less than 90% of the height of the electrode assembly 300, a force for fixing and supporting the electrode assembly 300 may be too weak. On the other hand, if the height of the core member 700 is more than 110% of the height of the electrode assembly 300, the core member 700 may contact components of the cap assembly 500.

Next, in the electrolyte solution injection step S4, the electrolyte solution 600 is injected up to the upper end of the electrode assembly 300. The electrolyte solution 600 allows lithium ions to move between the first and second electrode plates 310 and 320 during charge and discharge periods.

Figure 5D:
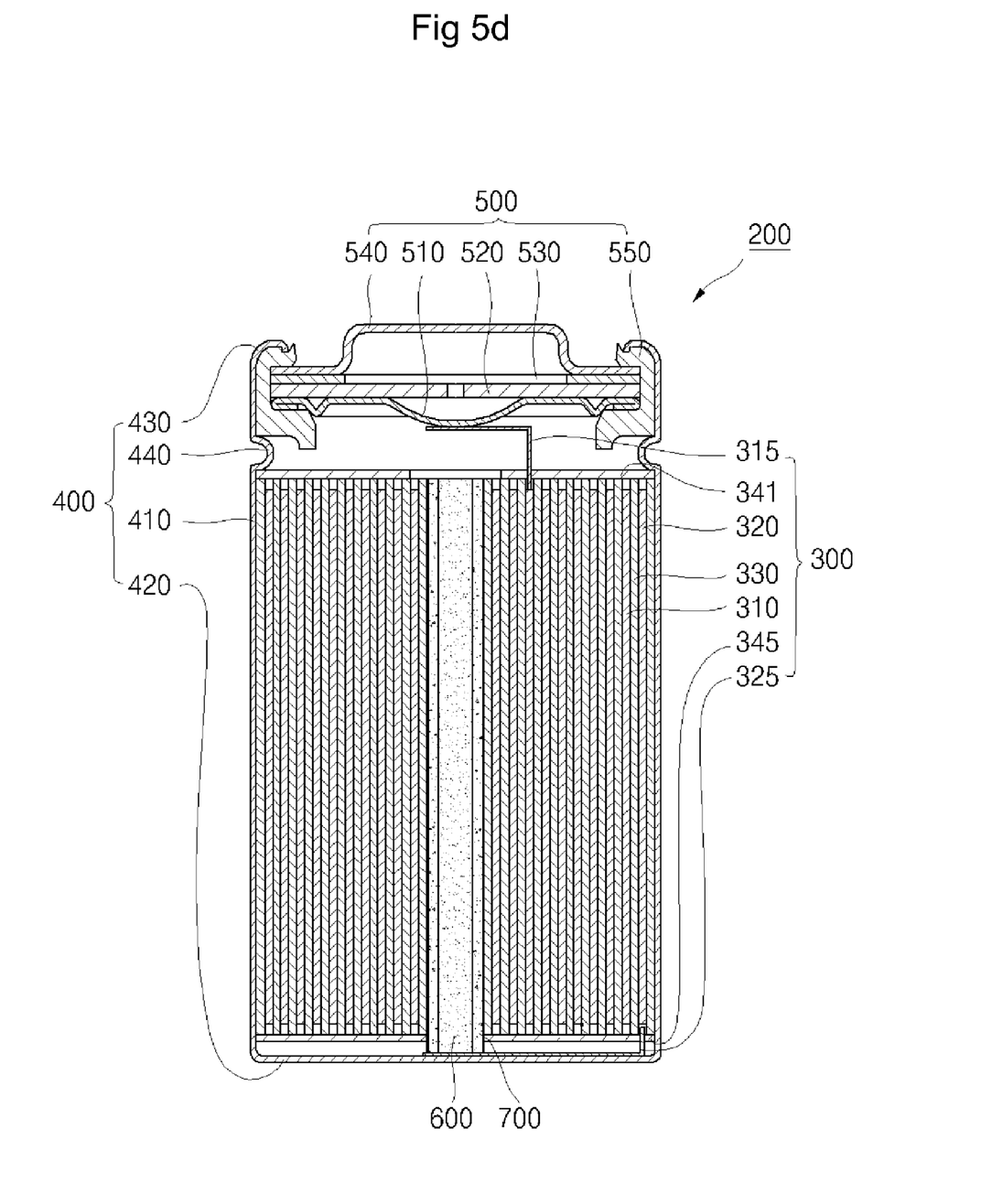

Referring to FIG. 5D, in the cap assembly combining step S5, the cap assembly 500 is combined with the upper portion of the cylindrical case 400 to prevent the electrode assembly 300 and the core member 700 from detaching and to prevent the electrolyte solution from leaking.

More specifically, a ring-shaped insulating gasket 550 is combined with the upper portion of the cylindrical case 400, and a conductive safety vent 510, which is electrically connected with one of the first and second electrode taps 315 and 325 of the electrode assembly 300 (for example, the first electrode tap 315), a PCB 520, a positive temperature device 530, and an electrode cap 540 are sequentially combined.

Next, a portion of the cylindrical case 400 corresponding to a lower portion of the insulating gasket 550 is subject to a beading process, thereby forming an inwardly recessed beading portion 440. Additionally, the upper portion of the cylindrical case 400 is subject to a crimping process to form a crimping portion 430. The beading portion 440 and the crimping portion 430 prevent the cap assembly 500 from detaching. As a result, the cylindrical lithium rechargeable battery 200 is completed.

In the cylindrical lithium rechargeable battery 200 according to embodiments of the present invention, since the core member 700 includes the short circuit preventing part 720, breakage of the separator 330 due to insertion or movement of the core member 700 may be prevented. Accordingly, it is possible to prevent short circuits between the first and second electrode plates 310 and 320 of the electrode assembly 300.

Further, unlike a conventional core member, in the core member 700 according to embodiments of the present invention, both ends of the cut 710 are not bent into an internal portion of the core member 700 but are maintained in a shape of a pipe, so that the electrode assembly 300 may be more effectively supported against external pressure.

Embodiments of the present invention include a core member having a short circuit preventing part so that it is possible to provide a cylindrical lithium rechargeable battery that may be capable of preventing electrode assembly short circuits.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cylindrical lithium rechargeable battery, comprising:
a winding type electrode assembly comprising a first electrode plate, a second electrode plate, and a separator between the first electrode plate and the second electrode plate;
a core member arranged in a central space of the electrode assembly and comprising a cut arranged along a longitudinal direction thereof and a short circuit preventing part;
a case comprising a space for accommodating the electrode assembly; and
a cap assembly combined with an upper portion of the case to hermetically seal the case,
wherein the short circuit preventing part comprises first edges disposed at an upper portion of the core member based on the cut and second edges disposed at a bottom portion of the core member based on the cut,
wherein the first edges and the second edges are directed in an inward direction of the core member to have a tapered shape,
wherein a first portion of the cut is not directed in an inward direction of the core member, and
wherein the cut has a first width at the first portion, the short circuit preventing part has a second width, and the first width is less than the second width.

2. A cylindrical lithium rechargeable battery, comprising:
a winding type electrode assembly comprising a first electrode plate, a second electrode plate, and a separator between the first electrode plate and the second electrode plate;
a core member arranged in a central space of the electrode assembly and comprising a cut arranged along a longitudinal direction thereof and a short circuit preventing part;
a case comprising a space for accommodating the electrode assembly; and
a cap assembly combined with an upper portion of the case to hermetically seal the case,
wherein the short circuit preventing part comprises first edges disposed at an upper portion of the core member based on the cut and second edges disposed at a bottom portion of the core member based on the cut,
wherein the first edges and the second edges are truncated to have a tapered shape,
wherein a first portion of the cut is not truncated to have a tapered shape,
wherein the cut has a first width at the first portion, the short circuit preventing part has a second width, and the first width is less than the second width, and
wherein the first portion of the cut and the short circuit preventing part are not directed in an inward direction of the core member.

3. The cylindrical lithium rechargeable battery of claim 2, wherein a tapered angle of the short circuit preventing part is less than 90°.

4. The cylindrical lithium rechargeable battery of claim 3, wherein the tapered angle is in a range of 30° to 60°.

5. A cylindrical lithium rechargeable battery, comprising:
a winding type electrode assembly comprising a first electrode plate, a second electrode plate, and a separator between the first electrode plate and the second electrode plate;
a core member arranged in a central space of the electrode assembly and comprising a cut arranged along a longitudinal direction thereof and a short circuit preventing part;
a case comprising a space for accommodating the electrode assembly; and
a cap assembly combined with an upper portion of the case to hermetically seal the case,
wherein the short circuit preventing part comprises first edges disposed at an upper portion of the core member based on the cut and second edges disposed at a bottom portion of the core member based on the cut,
wherein the first edges and the second edges are truncated to have rounded tapered shape,
wherein a first portion of the cut is not truncated to have a rounded tapered shape,
wherein the cut has a first width at the first portion, the short circuit preventing part has a second width, and the first width is less than the second width, and
wherein the first portion of the cut and the short circuit preventing part are not directed in an inward direction of the core member.

6. The cylindrical lithium rechargeable battery of claim 1, further comprising:
a lower insulating plate; and
an upper insulating plate,
wherein the lower insulating plate is arranged between the electrode assembly and a lower surface of the case, and the upper insulating plate is arranged between the electrode assembly and the cap assembly.

7. The cylindrical lithium rechargeable battery of claim 1, wherein one of the first electrode plate and the second electrode plate is electrically connected with a bottom surface of the case through an electrode tap, and wherein the core member is arranged on the electrode tap.

8. The cylindrical lithium rechargeable battery of claim 1, wherein a height of the core member is in a range of 90% to 110% of a height of the electrode assembly.

* * * * *